H. A. HALL.

CYLINDER FOR INTERNAL COMBUSTION ENGINES.

APPLICATION FILED FEB. 12, 1920.

Reissued June 1, 1920. 14,869.

WITNESS

Wm. F. Drew

INVENTOR

Harold A. Hall

BY

Booth & Booth

ATTORNEYS

UNITED STATES PATENT OFFICE.

HAROLD A. HALL, OF SAN JOSE, CALIFORNIA.

CYLINDER FOR INTERNAL-COMBUSTION ENGINES.

14,869. Specification of Reissued Letters Patent. Reissued June 1, 1920.

Original No. 1,274,161, dated July 30, 1918, Serial No. 216,324, filed February 9, 1918. Application for reissue filed February 12, 1920. Serial No. 358,124.

*To all whom it may concern:*

Be it known that I, HAROLD A. HALL, a citizen of the United States, residing at San Jose, in the county of Santa Clara and State of California, have invented a new and useful Improvement in Cylinders for Internal-Combustion Engines, of which the following is a specification.

My invention relates to a cylinder for internal combustion engines, and the objects of my invention are:

First, to provide a cylinder for internal combustion engines that will have four valve ports, two of which are intake valve ports and two are exhaust valve ports; and one in which the valves and valve guides are placed in the head of the cylinder, and one in which the valves operate parallel with the axis of the cylinder and not at an angle thereto or in additional valve chambers as is commonly the practice.

Second, to provide a cylinder for internal combustion engines that will have positive cooling water circulation in all parts of the cooling water compartments, and one in which the water compartments are divided into a plurality of separate water channels.

Third, to provide a cylinder for internal combustion engines that will have no angular explosion chamber recesses, and one in which the power loss derived from the explosion will be less than in cylinders now in general use for this class of engines.

Fourth, to provide a cylinder for internal combustion engines that is more readily machined and one in which the cost of manufacture is reduced as compared to cylinders of this type now in use.

A further object of my invention is to generally improve this class of cylinders for internal combustion engines so as to increase their usefulness, durability, and efficiency.

Further objects and advantages will appear in the following description, it being understood that various changes in form, proportions, and minor details of construction may be resorted to within the scope of the appended claims.

For a full understanding of the invention and the merits thereof, reference is to be had to the following description and accompanying drawings, in which.

Corresponding and like parts are referred to in the following description and indicated in all the views of the drawings by the same reference numbers.

Figure 4:
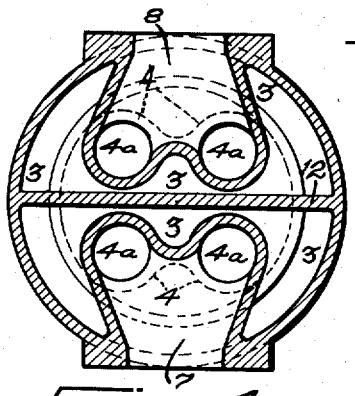
Fig. 4 is a cross section of the cylinder head at a position shown by line C—C of Fig. 3 showing the intake and exhaust ports, and the water compartment surrounding the ports and guides.
Figure 1:
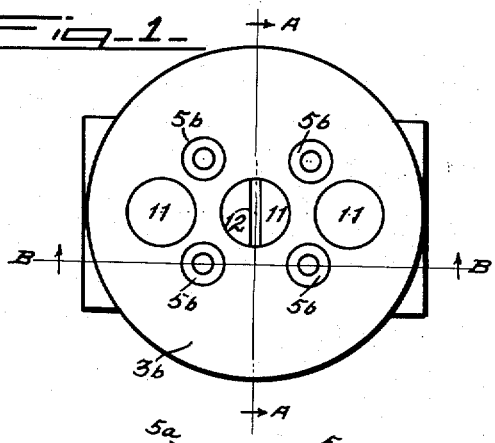
Figure 1 is a plan view of my improvement in cylinders for internal combustion engines showing the water outlets and valve guides.

My improvement in cylinders for internal combustion engines, forming the subject matter of the present invention comprises a body portion 1 made of cast iron or other suitable metal consisting of a cylinder 2, water cooling compartments 3, water jacket $3^a$, and cylinder head $3^b$.

At the upper end of cylinder 2 are the valve seats 4, valve ports $4^a$, valves 5, and valve stems $5^a$. These valves operate in valve guides $5^b$.

Valves 5 are for the purpose of mechanically controlling the intake and exhaust of explosive charges and burnt gases respectively, in and out of cylinder 2 by means of inlet port 6 and exhaust port 7, said valves being operated by any suitable mechanism not shown.

Near the upper end of cylinder 2 is shown a plurality of openings 8 for the purpose of attaching any suitable ignition system, preferably what is commonly known as the jump spark system.

At the lower end of cylinder 2, on the outer walls thereof, is the circular flange 9 adapted to hold the body portion 1 in place on any suitable crank case, crank case not shown.

At the lower end of cooling water compartments 3 is shown a plurality of water inlets 10 adapted to be connected to a suitable system of pump or thermo-siphon system of cooling water circulation not shown.

At the top of the body portion 1 in the cylinder head $3^b$ is shown a plurality of cooling water outlets 11, one of said outlets being placed in the center of the cylinder head $3^b$ and between the four valve guides $5^a$ so that the circulation of water will more readily cool these valves, said openings being adapted to connect to the return circuit of the cooling water circulating system.

Figure 2:
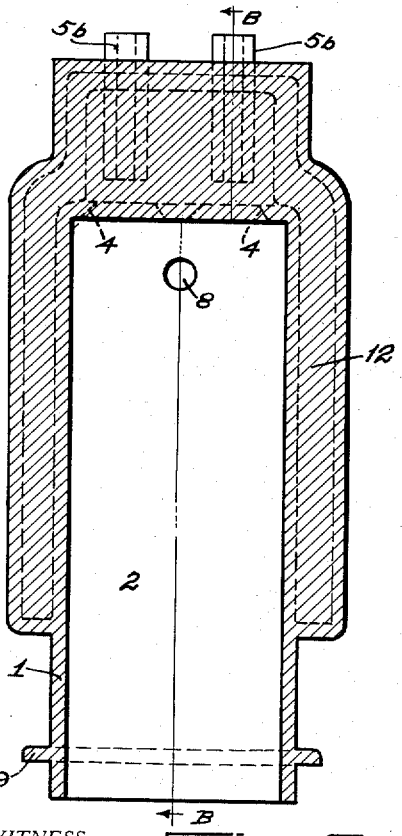
Fig. 2 is a sectional view on line A—A of Fig. 1 showing the web dividing the cooling water compartment.
Figure 3:
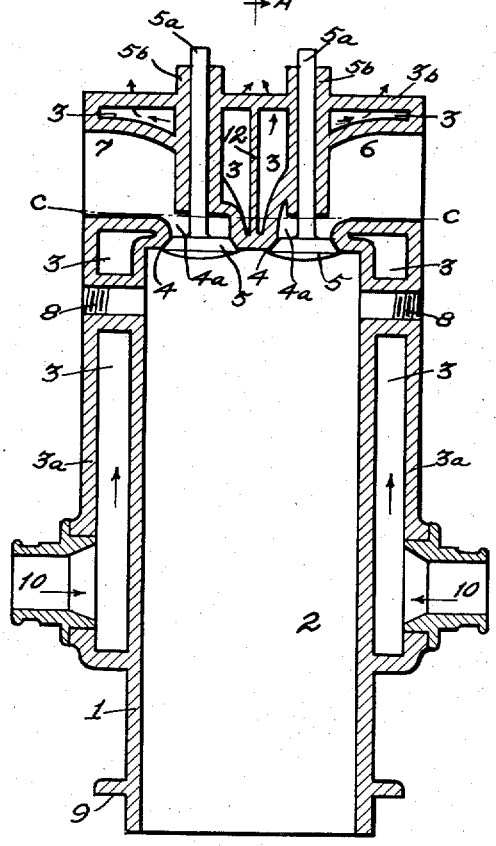
Fig. 3 is a sectional view on line B—B as shown at Figs. 1 and 2 showing two of the valves in place.

Dividing the cooling water compartment 3 into a plurality of water circulating chambers is the web 12 which is shown in longitudinal section at 12 in Fig. 2. This web is for the purpose of causing the circulation of the cooling water to be more equal and direct to all parts of the water compartments.

The operation of my improved cylinder is as follows:—

Valves 5 being mechanically controlled, regulate the intake of explosive charges and exhaust of burnt gas at predetermined periods through the plurality of valve ports $4^a$, thereby obtaining a quicker and more efficient change of explosive charges. Cooling water enters the cooling water compartments 3 through a plurality of inlet ports 10, being kept in proper channels by means of web 12, and is forced up to and around exhaust port 7 and inlet port 6 and valve guides $5^b$ as shown by the arrows. The cooling water is discharged from the compartments 3 through the central outlet 11 or through the plurality of such outlets if there be more than one, as here shown. This arrangement will cool the cylinder and cylinder head more efficiently than the methods now in use in that the cooling water entering through a plurality of inlets at the lower portion of the compartment is well distributed around the cylinder body, and by directing the circulation in the head compartment to the centrally disposed outlet, the water effectively reaches the vicinity of the valves and ports and cools them.

Having thus described my invention, what I claim as new and desire to secure by Letters Patent is:—

1. A cylinder for internal combustion engines having a cooling water compartment adjacent its sides and head, a plurality of openings at the lower end of said compartment for the admission of water thereto, a centrally located cooling water outlet on the top of the cylinder head, a plurality of valve-controlled ports in the cylinder head arranged about the central cooling water outlet, said ports having valve-stem guides whose longitudinal axis is parallel to the axis of the cylinder, an inlet port in the cylinder head in connection with a plurality of the valve-ports, and an exhaust port in the cylinder head in connection with a plurality of the valve-ports.

2. In an improvement in cylinders for internal combustion engines of the class described, the combination of a body portion made of cast iron or other suitable metal, a cylinder, a plurality of cooling water compartments adjacent said cylinder, a water jacket, a cylinder head, a plurality of valve seats in the cylinder head, a plurality of valve ports connecting with said valve seats, valves adapted to engage said valve seats, valve stems attached to the valves, valve guides centrally positioned over each valve seat their longitudinal axis being parallel with the axis of the cylinder, an inlet port connection with a plurality of the valve ports, an exhaust port connecting with a plurality of the valve ports, a plurality of threaded openings near the upper end of the cylinder adapted to receive spark plugs therein, an outwardly extending circular flange at the lower end of the cylinder, a plurality of cooling water inlets at the lower end of the cooling water compartments, a plurality of cooling water outlets at the top of the cooling water compartments, a water outlet centrally positioned between the valve guides, a web or partition through the cooling water compartments dividing the compartments into separate water circulation channels, substantially as shown and described.

In testimony whereof I affix my signature in the presence of two witnesses.

HAROLD A. HALL.

Witnesses:
W. W. Eitel,
L. E. Goodrich.